(12) United States Patent
Shaw et al.

(10) Patent No.: US 7,240,174 B2
(45) Date of Patent: Jul. 3, 2007

(54) SYSTEM AND METHOD FOR MIGRATING DATA BETWEEN MEMORIES

(75) Inventors: Mark E. Shaw, Garland, TX (US); Gary B. Gostin, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/193,215

(22) Filed: Jul. 29, 2005

(65) Prior Publication Data

US 2005/0259481 A1 Nov. 24, 2005

Related U.S. Application Data

(63) Continuation of application No. 10/336,430, filed on Jan. 3, 2003, now Pat. No. 6,959,370.

(51) Int. Cl.
G06F 12/00 (2006.01)
G06F 13/00 (2006.01)

(52) U.S. Cl. .................. 711/165; 711/141; 711/154

(58) Field of Classification Search ............... 711/100, 711/141–146, 154, 159–160, 165
See application file for complete search history.

(56) References Cited

U.S. PATENT DOCUMENTS

| | | | |
|---|---|---|---|
| 5,218,698 A | 6/1993 | Mandl | |
| 5,680,640 A | 10/1997 | Ofek et al. | |
| 6,108,748 A | 8/2000 | Ofek et al. | |
| 6,230,239 B1 | 5/2001 | Sakaki et al. | |
| 6,240,486 B1 | 5/2001 | Ofek et al. | |
| 6,356,977 B2 | 3/2002 | Ofek et al. | |
| 6,366,988 B1 | 4/2002 | Skiba et al. | |
| 6,374,327 B2 | 4/2002 | Sakaki et al. | |
| 6,401,163 B1 | 6/2002 | Kondo et al. | |
| 6,549,959 B1 * | 4/2003 | Yates et al. | ........... 710/22 |
| 2003/0115434 A1 | 6/2003 | Mahalingam et al. | |

* cited by examiner

*Primary Examiner*—Tuan V. Thai

(57) ABSTRACT

An embodiment of the invention provides a method for migrating data from one location to another comprising establishing a new memory location under control of a specific memory accessing device. The new memory location being where data, which is being migrated from a first memory location, is to be resident, the specific accessing device taking control of a certain portion of data resident at the first memory location, the control preventing the certain data from being accessed by any device other than the specific accessing device, obtaining, under control of the specific accessing device, a most recent version of the certain data from the first memory location, forwarding the obtained certain data to the new memory location, and when the obtained certain data is forwarded to the new memory location, marking the certain data as being gone from the first memory location such that attempts to access the certain data at the first memory location from a specific accessing device will be redirected back to the accessing device for redirection to the new memory location.

12 Claims, 3 Drawing Sheets

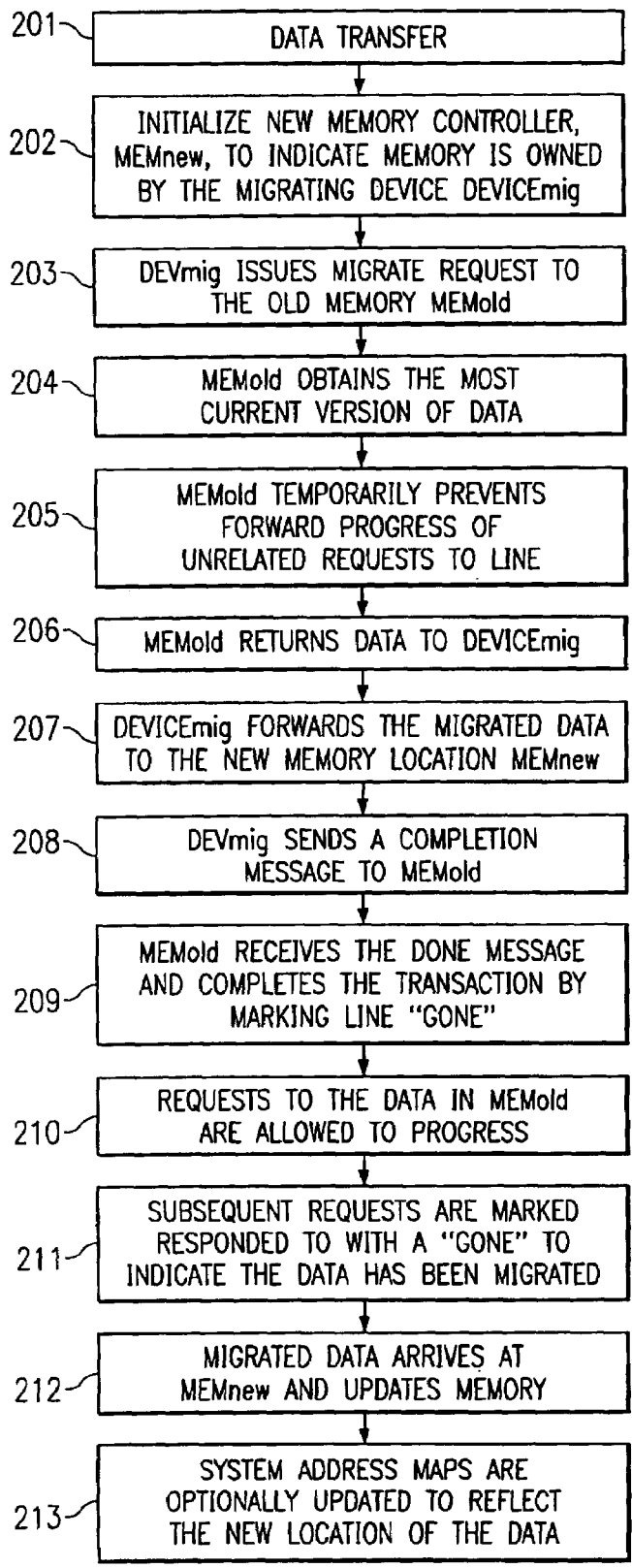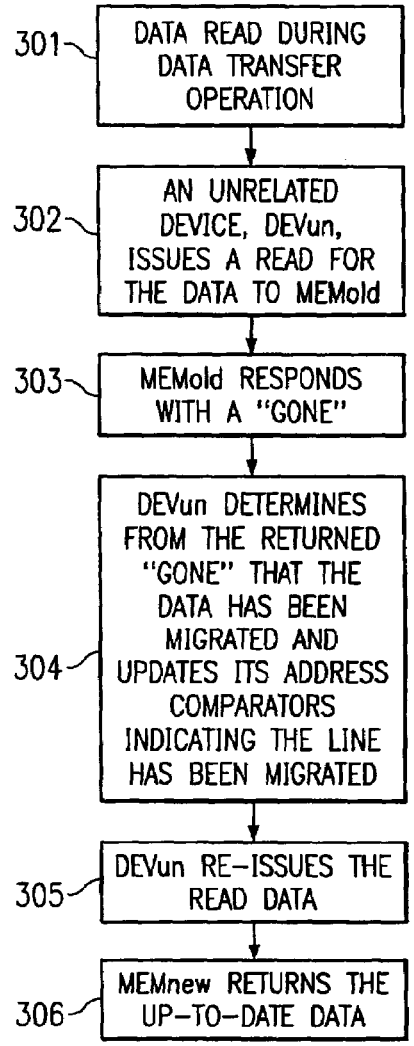

FIG. 5

| | OLD MEMORY | NEW MEMORY | ACCESSING DEVICE | SYSTEM |
|---|---|---|---|---|
| (8) IF ALL LINES MIGRATED, THEY CAN BE REMOVED | | | | |
| (7) | MIGRATED LINES NO LONGER ACCESSED | RESPONDS TO DIRECT ACCESS | DIRECTED TO NEW MEMORY PER SYSTEM MAP | CHANGE SYSTEM MAP |
| (6) LAST LINE MIGRATED | MIGRATED LINE(S) MARKED "GONE" | RESPONDS TO DIRECT ACCESS | DIRECTED TO NEW MEMORY PER SYSTEM MAP | OPTIONALLY CHANGE SYSTEM MAP |
| (5) | MIGRATED LINE(S) MARKED "GONE" | RESPONDS TO DIRECT ACCESS | DIRECTED TO NEW MEMORY PER SYSTEM MAP | OPTIONALLY CHANGE SYSTEM MAP |
| (4) SECOND LINE MIGRATED | MIGRATED LINE(S) MARKED "GONE" | RESPONDS TO DIRECT ACCESS | DIRECTED TO NEW MEMORY PER SYSTEM MAP | OPTIONALLY CHANGE SYSTEM MAP |
| (3) FIRST LINE MIGRATED | MIGRATED LINE(S) MARKED "GONE" | RESPONDS TO REDIRECTION FROM ACCESSING DEVICE | DIRECTED TO OLD MEMORY PER SYSTEM MAP REDIRECTED TO NEW MEMORY | |
| (2) MIGRATION BEGINS | SELECTED LINE(S) BLOCKED | BLOCKED BY MIGRATION DEVICE | DIRECTED TO OLD MEMORY PER SYSTEM MAP | |
| (1) NO MIGRATION | FULL ACCESS | NO ACCESS | DIRECTED TO OLD MEMORY PER SYSTEM MAP | |

SYSTEM AND METHOD FOR MIGRATING DATA BETWEEN MEMORIES

CROSS-REFERENCE TO RELATED APPLICATIONS

The present application is a continuation of and commonly assigned U.S. patent application Ser. No. 10/336,430, entitled "System and Method for Migrating Data Between Memories, filed Jan. 3, 2003 now U.S. Pat. No. 6,959,370, the disclosure of which is hereby incorporated herein by reference.

FIELD OF THE INVENTION

This invention relates to memory systems and more particularly to such system and methods in which data can be migrated from one memory to another.

DESCRIPTION OF RELATED ART

Data that is to be worked on by a processing system, or which is used for the operation and/or control of the system, is stored in memory devices of one type or another. Such systems are typically controlled by operating systems. While the fundamental operating principals of each such operating system are the same, they each none-the-less handle various specific functions in their own manner.

Thus, while every system has a method and procedures for accessing a memory to obtain data from a given location, the precise manner in which this memory access function is accomplished differs for different operating structures and different operating systems. Thus, problems arise when any attempt is made to swap out one memory for another, since the procedure would be different for different operating systems. In effect, any such swapping operation entails migrating data from one memory to another. Typically, in the past, this has been accomplished when the system, or at least the memory from which the data is being swapped, has been turned off, or vacated by the operators system.

While there have been hints in the literature of data being migrated "live", each of these hints has had accompanied with it caveats of long system stalls and restrictions on the ultimate configuration of the memory. For example, Dynamic Reconfiguration User's Guide, obtainable from Sun Microsystem's website at http://www.sun.com/, Part No.: 805-0080-10 illustrates the restrictions and stalls that must occur when copying large amounts of memory to swap space (e.g. Disk) or other boards according to one previous solution. The guide points out that if memory interleaving is used between system boards, those system boards cannot be detached. This is because Dynamic Reconfiguration does not yet support inter-board interleaving. By default, hpost (1M) does not set up boards with interleaved memory. Before a board can be detached, the memory on that board must be vacated by the operating system. Vacating a board means flushing its pageable memory to swap space and copying its permanent memory—that is, non-pageable kernel and OBP memory—to another memory board. When permanent memory is on the detaching board, the operating system must find other memory to receive the copy. This is a typical stall situation.

Assume that data is resident in a first memory and is to be moved to a second memory. One way of moving the data would be to close down the first memory, transfer the data to the second memory and then bring the second memory back on-line. One problem with this approach is an intolerable delay time while the system stops and waits for the data transfer to be completed. Under such an example, a system message would generally have to be sent to all possible data accessing devices telling each device not to access either the first or second memories until further notice.

To speed the process, the transfer could be designed to occur with large bytes of information at a time, thereby placing constraints on the location of the resulting data in a memory. However, such constraints are often not practical and result in less efficient use of memory as otherwise is desirable.

In addition, using known systems for memory migration requires that when the new memory finally come on-line, the system maps must be changed. Also, since there then would be a pent up demand for memory access, an overload, or at least a race condition, could occur.

BRIEF SUMMARY OF THE INVENTION

An embodiment of the invention provides a method for migrating data from one location to another comprising establishing a new memory location under control of a specific memory accessing device, the new memory location being where data, which is being migrated from a first memory location, is to be resident; the specific accessing device taking control of a certain portion of data resident at the first memory location, the control preventing the certain data from being accessed by any device other than the specific accessing device; obtaining, under control of the specific accessing device, a most recent version of the certain data from the first memory location; forwarding the obtained certain data to the new memory location; and when the obtained certain data is forwarded to the new memory location, marking the certain data as being gone from the first memory location such that attempts to access the certain data at the first memory location from a specific accessing device will be redirected back to the accessing device for redirection to the new memory location.

An embodiment of the invention provides a method of adding new memory to a processing system while the processing system is running, the method comprising physically associating a new data storage structure with the processing system; selecting from within an existing data storage structure a first portion of data to move from the existing structure to the new structure, the selection causing data locations corresponding to the data selection in said existing structure temporarily to not respond to subsequent data access requests; moving the selected first portion of data to the new structure; and upon the completion of the moving, causing the data location corresponding to the selected first portion of the data selection in the existing structure to respond to subsequent accessing requests by sending to an accessing device a location in the new structure where the selected first portion of data has been moved.

Embodiments of the present invention further provide a system for migrating data from one location to another comprising a first set of memory locations, the first set of locations holding data accessible by at least one accessing device; a second set of memory locations, the second set of memory locations available for holding data accessible by said at least one accessing device; means for accessing selective locations within both the first and second memory locations, the accessing preventing access to the selective memory locations by any other devices; a transfer path for moving data from selected locations within the first set of memory locations to selected locations within the second set of memory locations; and means operative when the data is moved into the second set of memory locations for removing the preventing of the access.

An embodiment of the invention provides a computer comprising an operating system for controlling the computer, at least one memory having locations therein at which data is stored; at least one accessing system for obtaining data from the locations within the at least one memory, the manner of the accessing controlled in part by the operating system in accordance with a data storage map; a system for selecting locations within the at least one memory which data is to be migrated, when selecting system operable for inhibiting accessing to both the to and from locations while data is in the process of migrating between the to and from locations; then system further operable after the data has migrated for allowing an accessing system to access data locations in a memory from which data has migrated and to redirect, under control if the operating system and the memory, and such access to the location to which the data has migrated; and the system further operable after all data which is to be migrated has migrated for causing the operation system to modify the selecting system such that new data accessing instruction are directed to the memory location to which the data has migrated and not to the previous location of the data.

Embodiments of the invention further provide a method of operating a computer comprising enabling an operating system within the computer to control functions of the computer, one such function being the accessing of data from locations within a first memory, the accessing in accordance with a map of data; adding, while the computer is in operation, an additional memory to the computer, the additional memory having locations therein where data can be stored; migrating, while the computer is in operation, data from the first memory to the additional memory, the migrating occurring in stages, each stage containing portions of data from the first memory; and while the stages are being migrated, enabling the first memory to redirect to the additional memory any data accesses directed to portions of data which have already migrated and when all of the stages are complete, changing the map so that subsequent data accesses are directed to the additional memory.

BRIEF DESCRIPTION OF THE DRAWINGS

FIGS. 2, 3 and 4 show flow charts of the operation of one embodiment of the inventive concepts; and FIG. 5 shows a timing chart of system operation of one embodiment of the invention.

DETAILED DESCRIPTION OF THE INVENTION

Systems and methods of the invention are arranged for migrating data from one location to another without turning the system off or disrupting the operating system or application processing. A system, in one embodiment, operates to establish a new memory location under control of a specific memory accessing device. The new memory location is where data, which is migrated from a location in a first memory is to be resident. In operation, when the accessing device takes control of certain portions of data resident in the first memory that data is prevented from being accessed by any other device. At the same time the most recent version of the data portions from the first memory are forwarded to the new memory. When the forwarded data is resident in the new memory the first memory data is marked as being gone therefrom such that attempts to access will be redirected back to the accessing device and redirected from the accessing device to the new memory.

One advantage of the concepts described herein is that memory can be migrated one piece at a time without requiring system-wide resources, while also allowing the operating system (OS) to continue using the exact same physical address map, thereby alleviating complex and intrusive changes to software.

Since the inventive concepts do not require changes to the operating system and can be performed independent of the operating system, the present memory migration methodology invention may be implemented in any operating system, including by way of example, OSes, Windows, UNIX, LINIX and the like. Such implementations are preferably independent of the underlying memory configuration, such that memory can be spread in blocks, such as, 64 byte blocks, thereby allowing memory to be replaced and upgraded without shutting down the system or its applications. Systems employing this memory migration methodology can be further utilized to reorganize memory for more optimal performance, typically done after new memory is added to the system.

Figure 1:
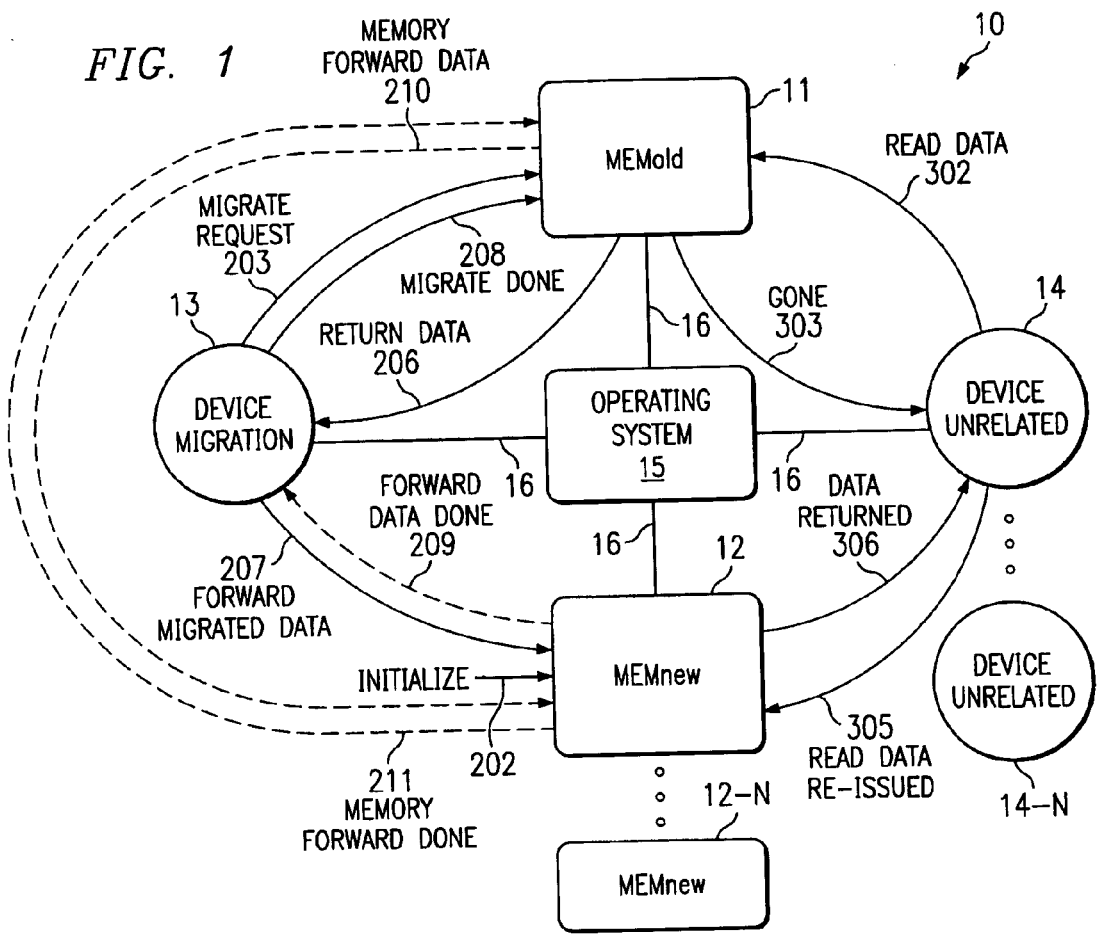
FIG. 1 shows the interaction of the various elements of one embodiment of the inventive concepts.

Turning now to FIG. 1, there is shown, according to one embodiment of the invention, a representative computer system 10 having an old memory 11 in which data is resident, new memory 12 (or memories 12-N) to which data is to be migrated, device migration control 13, and devices 14 to 14-N. Devices 14 to 14-N are preferably devices which are capable of accessing a memory, such as old memory 11 and/or new memory 12.

The interactions shown between devices 11, 12, 13 and 14, as well as the rest of computer system 10, is controlled, at least in part, by operating system 15 interconnected by bus 16. These interactions will be discussed with respect to FIGS. 2, 3 and 4.

Turning now to FIG. 2, there is shown flow diagram 20 which shows the data transfer interaction, such that data is transferred between memory 11 and memory 12, between the devices of a one embodiment, as shown in FIG. 1. Process 201 establishes that a data transfer is to take place, such as upon the installation of a new memory or in response to a memory optimization operation. Process 202 initializes the new memory controller within or associated with memory 12 to indicate that new memory 12 is "owned" by migration control device 13. A purpose of initializing a memory controller of new memory 12 may be to prevent race conditions and silent data corruption in a message based system. For example, in a typical computer system, messages sent to memory are not always deterministic in either the path taken or the time it takes to arrive at the destination. Initializing the new memory controller to obtain data from migration control device 13 guarantees that when an unrelated request beats the migrated data to new memory 12, a controller of new memory 12 knows to request the latest copy of data from migration device 13.

Initializing the new memory controller to obtain data from migration control device 13 is one technique to implement the migration hardware to solve the race condition that occurs when an unrelated request beats the migrated data to new memory 12. Mechanisms that are already in place for normal system operation may be employed, either directly or with minor modifications, to resolve the race condition. For example, new memory 12 may take steps appropriate to the system to prevent any other request from gaining access to any data that is indicated as being "owned" by migration control device 13 until the migration of that block of data is complete.

The mechanism for accomplishing these preventions and selections may be the mechanism of the operating system and the system in which the devices reside, and are independent of the inventive concepts herein discussed. In one embodiment, one technique for blocking access is for old memory 11 to send a "busy" message to a requesting device 14 so that the request will be re-issued at a later time similar to a "busy" signal on a phone line. Another technique is to load all requests for the blocked memory into a queue built into hardware or main memory. When the memory is un-blocked, the queued requests are then processed similar to a queue from a customer service center.

In process 203 of the illustrator embodiment, migration device 13 issues a migrate request to old memory 11 for a particular block of data to migrated. This block could most typically be a line, several lines, a block or whatever is appropriate for the system. The system could, for example, migrate 64 kilobits of data at a time, if desired. The reason for such a small amount of data at the time, and the ability to handle such small data amounts, will become more apparent from that which is to follow.

Old memory 11 obtains from the selected portion of the memory the current version of the data according to process 204 of the illustrated embodiment. At the same time under process 205 old memory 11 takes steps appropriate to the system to prevent any other request which is directed to the data that has been taken from gaining access to that data. For example, if a block has been taken, then all requests to that block are prevented. The mechanism for accomplishing these preventions and selections may be the mechanism of the operating system and the system in which the devices reside, and are independent of the inventive concepts herein discussed. Techniques for blocking access to old memory 11 are similar to those described above for blocking access to new memory 12.

Old memory 11 provides the current version of the data from the selected portion of the memory to migration device 13 under process 206. Process 207 controls migration device 13 to transfer the data to new memory 12. According to the illustrated embodiment, as soon as this is accomplished, under process 208, migration device 13 sends a completion message to old memory 11. Old memory 11, upon receiving the completion message, completes the transaction by marking the line of data which has been sent to migration device 13 as "gone" (process 209). This marking can be done by tags, address comparators, etc., and is in keeping with the specific operating system and the system in which the memory is operating. Coherency directory tags are one method of tracking the location of a line that is "gone". Tags may be used to track the state and location of memory chunks. The use of the tag "gone" state generalizes the algorithms to all out-of-order migrations and may simplify the overall design. Address comparators could be used to track the migrated lines if the migration occurs in sequential address order.

After the lines from which data has been taken, have been marked "gone", future requests to old memory 11 are allowed to progress as normal, as shown in process 210. In process 211, subsequent request from any device, such as device 14, are responded to with the "gone" indication to indicate to the accessing device that the data has been migrated. Migrated data, as shown in process 212 has arrived at new memory 12 and that memory is updated for the specific lines or blocks of information that have been delivered and processed to by migration controller 13. The system address map in all devices 14 through 14-N may be updated to reflect that the migrated data is now resident in new memory 12 (process 213). The system maps can be updated chunk-by-chunk to allow for best performance or they can be updated after the completion of the entire data migration.

Turning now to FIG. 3, flow chart 30 shows a situation where data is read from memory during the data transfer operation. In process 302 it is assumed that an unrelated device 14 desires to access a line of code from old memory 11. This access is attempted before the memory "gone" notation is set with respect to the target line of data in old memory 11. Nothing will happen because the targeted information in old memory 11 has been taken out of service for that instant.

However, once the "gone" message has been set in old memory 11, as discussed with respect to FIG. 2, process 303 responds with the "gone" message to device 14. Device 14, as shown in process 304, determines based on the returned "gone" message that the data has been migrated, indicating that the line should now be fetched from the new location, e.g. memory 12. This information may be obtained from new memory 12 using system address maps, as discussed with respect to process 213, FIG. 2.

At process 305, device 14 reissues the read data command, this time it being directed to the proper location in new memory 12, and as shown in process 306, new memory 12 returns the up-to-date data. Note that only those devices that actually target old memory 11 during the transfer period would have the new tags. The entire system has not been updated at this point, and therefore another device 14-N (not shown) attempting to read the same line of information would go through the same process such that the device 14-N would target old memory 11 at a specific line, therein and would receive a "gone" message in return. Device 14-N would then update its tag information, and then target new memory 12 to obtain the desired information.

In summary, during the time when data are being transferred from old memory 11 through migration device 13 to new memory 12, those lines are marked as "not available". Then when the information is sent to be stored in new memory 12, the corresponding data line in old memory 11 is marked "gone". The "gone" message is issued to any accessing device to tell such device to redirect the request to new memory 12.

Figure 4:
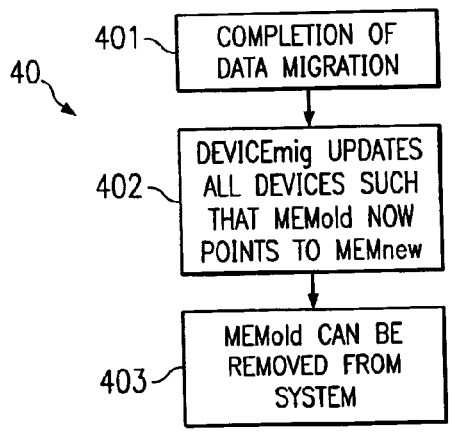

Eventually the migration of data is finished (represented by process 401 of FIG. 4). Either all of the data has been removed from old memory 11 and transferred to new memory 13 or, while not shown, transferred to several memories or only some of the data has been removed from old memory 11. In either event, when the process is completed, as shown in flow diagram 40 of FIG. 4 at process 402, migration device 13 updates all system devices that have access to old memory 11 showing the new memory location of the migrated data. At this point, under control of process 403, if old memory 11 has been completely emptied it can be removed from the system, since accessing devices, such as device 14 no longer points toward old memory 11, but instead now points toward new memory 12 in accordance with the operating system parameters of the system in which the devices are operating.

Note that a new location, according to the present invention, can be in a memory completely new to the system, a memory already in place in the system, or even a different location within the same memory. Accordingly, it should be appreciated that the terms "old" and "new" as used herein are relative terms used in aiding the reader's understanding of the invention and are not intended to limit the invention to any particular temporal or status hierarchy with respect to memories.

Also, the "gone" message is representative of any message which accomplishes the redirect feature such that an accessing device will be directed to another location under local (not overall system) control. Accordingly, the present invention is not limited to any particular form of the aforementioned "gone" message.

FIG. 5 shows a timing chart with arbitrary times running up the left side. The columns show old memory 11, new memory 12, accessing device 14 and system 15. As shown, between time 0 and 1, no migration is occurring and thus all accessing devices are directed to the old memory in accordance with the system map. During this time there is no access to new memory 12 and, in fact, new memory 12 may not even physically be present in the system. At an arbitrary time between times 1 and 2 migration begins which implies that new memory 12 has been added to the system or is now available. Migration device 13, as discussed above, may select which ever lines in old memory 11 are to be transferred initially. At the same time, migration device 13 may block any access to new memory 12 which by now has been added to the system. As can be seen in accessing device 14 column, any request for data from old memory are continuing to be directed to the old memory which has been blocked with respect to lines selected for migration, as shown in old memory column 11. Between arbitrary times 2 and 3 a first line or lines have been migrated from old memory 11 to new memory 12 and the lines in old memory 11, which have been migrated, are now marked "gone". At this time, any accessing device 14, which is directed to old memory at the location of the migrated lines, is redirected to the new memory 12, as discussed above. This operation continues until such time as the last line has been migrated from old memory 11, which in our hypothetical example is at time 6. Until this time, the system continues, such that every time a set of lines is marked "gone" in old memory 11, the accessing device 14 is redirected to the proper location in new memory 12, as discussed above. Once migration has finished from old memory 11 system 15 changes the system map, such that from that point on accessing devices 14 will be directed to the new memory 12 instead of the old memory 11 for all lines which have been migrated. And as discussed, old memory 11, if it is empty can now be removed from the system. Note that the operation with respect to FIG. 5 has all occurred with the system fully operational and with minimal down time of the system.

Note also that as discussed above, the "gone" messages pertaining to the locations in old memory 11 where data has migrated from are only temporarily necessary during the time when information is being transferred. After the transfer is complete, a global messages can then be issued. It should also be noted that, if decided, the system map optionally can be changed at any time, as shown in FIG. 5, between times 3-4, 4-5, and 5-6 in the "system" column. This would eliminate the necessity of the accessing devices going first to the old memory, only to receive the "gone" message. This optional system map change can be line by line or can be by chunks.

Another embodiment involves handling of requests from unrelated devices to data that is actively being migrated. When migration device 13 issues migrate request 203 (FIG. 2) to memory old 11, memory old 11 marks the data "gone" immediately upon issuing return data 206. Read data 302 (FIG. 3) by device unrelated 14 (FIG. 3) immediately receives gone message 303 and generates read data 305 to memory new 12. Memory new 12 blocks access using methods previously described until forward migrated data 207 is received by memory new 12. The simplification to this embodiment is that migration device 13 does not need to issue message migrate done 208 and memory old does not need to block read data 302 and can issue the gone 303 message immediately.

Another embodiment to the invention involves the path of the migrated data. When migration device 13 issues migrate request 203 to memory old 11, memory old 11 marks the data "gone" immediately upon issues the new message mem forward data 210 directly to memory new 12. Memory new 12 responds by sending the new message mem forward done 211 to memory old 11, which in turn responds to read data 302 with the gone 303 allowing the device unrelated 14 to re-issue read data 305 and obtain data returned 306. The advantages of this embodiment are that migration device 13 only issues the migrate request 203 and never handles data, the initialize step 202 is unnecessary, and the race condition of the re-issued read data 305 arriving at memory new 12 before the mem forward data 210 is prevented.

Another embodiment to the invention involves the path of the migrated data. When migration device 13 issues migrate request 203 to memory old 11, memory old 11 marks the data "gone" immediately upon receipt and issues the new message mem forward data 210 directly to memory new 12. Memory old 11 unblocks read data 302 from device unrelated 14 and responds with gone 303 allowing device unrelated 14 to re-issue read data 305 and obtain data returned 306. The advantages of this embodiment are that migration device 13 only issues the migrate request 203 and never handles data and that memory new 12 never issues messages to memory old 11.

Another embodiment involves the path of the migrated data. When migration device 13 issues the migrate request 203 to memory old 11, memory old 11 marks the data "gone" immediately upon issues new message mem forward data 210 directly to memory new 12. Memory new 12 responds by sending new message mem forward done 211 to memory old 11, which in turn responds to read data 302 with gone 303 allowing device unrelated 14 to reissue read data 305 and obtain data returned 306. The advantages of this embodiment are that migration device 13 only issues the migrate request 203 and never handles data, the initialize step 202 is unnecessary, and the race condition of the reissued read data 305 arriving at memory new 12 before the mem forward data 210 is prevented.

What is claimed is:

1. A method of adding new memory to a processing system while said processing system is running, said system comprising:
    physically associating a new data storage structure with said processing system;
    selecting from within an existing data storage structure a first portion of data to move from said existing data storage structure to said new data storage structure, said selection causing data locations corresponding to said data selection in said existing data storage structure temporarily to not respond to subsequent data access requests;
    moving said selected first portion of data to said new data storage structure; and
    upon the completion of said moving, causing said data location in said existing data storage structure corresponding to said selected first portion of data selection to respond to subsequent accessing requests by sending to an accessing device a location in said new data storage structure where said selected first portion of data has been moved.

2. A method of claim 1 further including:
repeating said selecting, moving and causing steps for each portion of data that is to be moved.

3. A method of claim 2 further including:
when all portions of data that are to be moved have been moved, then updating the processing system such that all devices that can access said existing data storage structure for data at said data locations pertaining to the portions that have been moved to access instead proper locations within said new data storage structure.

4. A method of claim 3 further including:
removing said existing data storage structure from said processing system.

5. A method of claim 1 further including the step of:
preventing the accessing of data from both said new data storage structure and said existing data storage structures for a period of time including said moving step.

6. A method comprising:
adding memory to a processing system while said processing system is running, said adding memory to said processing system comprising:
associating a new data storage structure with said processing system, said new data storage structure being separate from said processing system and any data storage structure thereof prior to said associating;
causing a selected data location in an existing data storage structure of said processing system temporarily to not respond to subsequent data access requests, said selected data location corresponding to a first portion of data to move from said existing data storage structure to said new data storage structure;
moving said selected first portion of data to said new data storage structure; and
causing said selected data location in said existing data storage structure to respond to subsequent accessing requests by sending to an accessing device a location in said new data storage structure where said selected first portion of data has been moved upon the completion of said moving.

7. The method of claim 6, further comprising:
removing said existing structure from said processing system when said existing structure has been emptied of data.

8. A method of claim 6, further including:
repeating said first recited causing, moving, and second recited causing for a plurality of portions of data to be moved from said existing data storage structure to said new data storage structure.

9. A method of claim 6, further including:
updating a memory controller of the processing system such that all devices that access said existing data storage structure for data at said selected data location that has been moved to access a location within said new data storage structure.

10. The method of claim 9, wherein said updating said memory controller provides access to said location within said new data storage structure without updating an operating system of said processor system.

11. A method of claim 6, further including the step of:
preventing the accessing of data from both said new data storage structure and said existing data storage structures for a period of time including during said moving.

12. A system comprising:
an existing data storage structure providing storage of data in association with a processing system, said existing data storage structure having at least a first portion of data stored therein at a selected data location;
a new data storage structure separate from said existing data storage structure, said new data storage structure being added to a processing system while said processing system is running;
a data migration control device operable to cause a selected data location in an existing data storage structure of said processing system temporarily to not respond to subsequent data access requests, said selected data location corresponding to said first portion of data, said data migration control device further operable to move said selected first portion of data to said new data storage structure, said data migration control device further operable to cause said selected data location in said existing data storage structure to respond to subsequent accessing requests by sending to an accessing device a location in said new data storage structure where said selected first portion of data has been moved.

* * * * *